United States Patent Office 3,472,835
Patented Oct. 14, 1969

3,472,835
SCHARDINGER DEXTRINS
Sheldon A. Buckler, Rock F. Martel, Stamford, and Raymond J. Moshy, Westport, Conn., assignors to American Machine & Foundry Company, a corporation of New Jersey
No Drawing. Filed Feb. 12, 1964, Ser. No. 344,248
Int. Cl. C07b 21/00; C08b 28/00
U.S. Cl. 260—209                6 Claims

ABSTRACT OF THE DISCLOSURE

This invention relates to novel complexing agents and more specifically to insoluble derivatives of cyclic dextrins otherwise known in the literature as Schardinger dextrins. The invention further relates to methods of preparation of complexing agents derived from Schardinger dextrins and to their use in separation processes.

Briefly, the present invention comprises in its broad aspects a reaction product and a process for the manufacture thereof, made by reacting cyclic dextrin and an organic compound capable of reacting with at least two hydroxyl groups of the dextrin. The new compositions of this invention are particularly useful, for example, as separating media or entrapping media in the food processing field, chemical separation field, pharmaceutical field and in the area of petroleum fractionation.

The cyclic dextrins are a class of compounds possessing the property of forming a special type of complex known as an inclusion complex. Such complexes provide a method of anchoring or entrapping a chemical compound, known as the guest, within the complexing agent which is known as the host, without the formation of chemical bonds. The range of chemical compounds which may be so anchored is very broad, but a substantial degree of selectivity can be achieved by employing different cyclic dextrins. This is possible because each of the cyclic dextrins in its molecular configuration has a cavity of a size peculiar to that particular dextrin and will form a complex with a given chemical compound only when the latter is of a size and shape so as to make inclusion possible.

Schardinger dextrins or cyclic dextrins may be characterized generally by the formula:

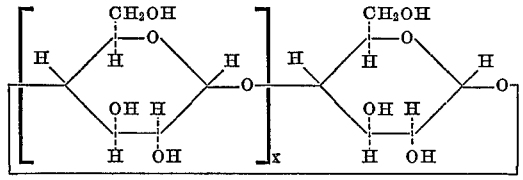

wherein $x$ may have a value of from about 5 to 12. The alpha, beta and gamma cyclodextrins wherein $x$ equals 5, 6 and 7, respectively, comprise the particularly preferred compounds.

We have found that the cyclic dextrins, separately or in combination, can be employed effectively and economically in separation and purification processes functioning in much the same fashion as compounds described in the art as "molecular sieves." In the past, a major disadvantage in the effective use of these cyclic compounds for many applications has been their solubility, particularly in water and because they are soluble it has not been generally possible to employ the cyclic dextrins in a convenient manner, for example, in the selective removal of materials from liquid or gas streams which contain significant amounts of water or other liquids which are solvents for the cyclic dextrins.

It is a principal object of this invention to provide chemical derivatives of the cyclic dextrins which are substantially insoluble in water but still possess the selective complexing action associated with the underivatized cyclic dextrins. It is a further object of this invention to provide suitable means for the preparation of insoluble cyclic dextrin derivatives of this kind. It is a still further object of this invention to employ cyclic dextrin derivatives insolubilized in accordance with the invention as a separation and purification media, or as a mechanism for the concentration of flavor or aroma bodies, or for the concentration or selective removal of physiologically active materials from aqueous solutions. A further object of the invention is to provide an effective tobacco smoke filter especially a cigarette filter comprising cyclic dextrin derivatives which are substantially water insoluble. Other objects and advantages will become apparent from the more detailed description of the invention provided hereinafter.

The insoluble cyclic dextrin derivatives of the instant invention are prepared either by reacting either an individual cyclic dextrin, a mixture of cyclic dextrins, or an essentially carbohydrate mixture containing cyclic dextrins with a chemical compound capable of reacting with two or more of the hydroxyl groups of the cyclic dextrins. Compounds which may function in this fashion may include, for example, an agent containing a single functional group such as an aldehyde which can react with two hydroxyl groups in the formation of an acetal, or an agent containing two or more functional groups per molecule each of which is capable of reacting with a single hydroxyl group of a cyclic dextrin. As employed herein substantially water insoluble cyclic dextrin derivatives refer to compounds which do not dissolve appreciably in water even after a considerable residence time including elevated temperature.

A suitable solvent such as dimethyl sulfoxide, dimethyl formamide, pyrolidone, water, and the like, may be employed as the reaction medium or the reaction may be carried out in a liquid medium in which one or more of the reactants is partially or substantially insoluble. The other reaction conditions such as time, temperature, and pressure are appropriate to promote substantially complete reaction. These vary depending on the specific type of chemical agent employed.

Suitable functional groups in the chemical insolubilizing agent are, for example, aldehyde, ketone, alkyl halide, isocyanate, acyl halide, carboxyl, ester, hydroxy methylamine, epoxide, beta hydroxyethyl sulfone, beta chloroethyl ether, silicon halide and the like. Illustrative of the chemical insolubilization agents which may be employed in the preparation of insoluble cyclic dextrin derivatives are glyoxal, formaldehyde, various polyhalohydrocarbons, e.g., p-xylylene bromide, chloromethylated polystyrene, 1,5-diiodopentane, dialdehyde starch, tolylene-2,4-diisocyanate, dimethylterephthalate, dichlorodimethylsilane, epichlorohydrin, adipic acid, sebacyl chloride, dimethylol urea, trimethylol melamine, diglycidyl ether of 1,4-butanediol, tetramethylene diisocyanate, bis(beta-hydroxyethyl) sulfone, and bis(beta-chloroethyl)ether. The prefix "poly" as employed herein in conjunction with the insolubilizing agent, e.g. polyhalohydrocarbon, polyisocyanate, polyepoxide, polyhydroxymethylamine, etc., include the di- tri- as well as higher members, i.e. of the compounds as well as their substituted and unsubstituted alternates.

The ratio of chemical insolubilization agent, i.e. the compound capable of reacting with two or more hydroxyl groups of the cyclic dextrin, to cyclic dextrin or cyclic dextrin mixture employed, varies considerably depending on the equivalent weights of the reactants. Generally, this ratio varies from about 10:1 to about 1:20.

The insolubilized cyclic dextrins of the instant invention can be employed advantageously in a number of commercially important uses. For example, in the selective filtration of tobacco smoke it has been found that insolubilized dextrins can be incorporated in the filter of a cigarette, cigar or pipe to achieve selective removal of undesirable smoke components such as polynuclear hydrocarbons and phenols. The proportion of different materials removed from the smoke stream can be varied as desired by changing the ratios of the different cyclic dextrins in the insolubilized product. Thus, when used as a smoke filter, a composition containing a relatively high proportion of the alpha cyclic dextrin will anchor or entrap a relatively high proportion of small molecules in the smoke stream, whereas a composition containing relatively large amounts of the larger beta, gamma, and higher cyclic dextrins will selectively capture a higher proportion of the larger molecules.

Another area in which the insolubilized cyclic dextrins may be employed advantageously is in the concentration of flavors and aromas from gas or liquid media. The insolubilized cyclic dextrins obtained from a single cyclic dextrin or a mixture thereof can be arranged, for example, as a fixed bed through which is passed food derivatives or products in gas or liquid form. When so employed, desirable flavor and aroma notes which might otherwise be lost in food processing can be retained and later released for incorporation in a food product. Typical food derivatives which may be processed in this fashion are coffee grinder gas, orange water aroma, meat juices, vegetable juices, and the like. These flavor and aroma notes are particularly valuable for addition to concentrated or dehydrated foods which may otherwise be deficient in this regard.

Insolubilized cyclic dextrins may also be employed advantageously in the preparation of a chewing gum with long lasting flavor. This is accomplished by incorporating into a chewable gum base a flavor such as mint obtained from peppermint oil which is complexed in an insolubilized cyclic dextrin. As the gum is chewed, the flavor is released by the action of the moisture in the mouth. In this application, as in many other cases, employing the cyclic dextrins in an insolubilized form is advantageous since in their normal form they would dissolve in the mouth and release the flavor much more quickly.

Numerous other applications for the novel insolubilized cyclic dextrin derivatives are contemplated including usage in the pharmaceutical, petroleum, and chemical industries where selective removal, purification, or concentration of a particular component or group of components is desired. Some specific areas in these important industries where insolubilized cyclic dextrins may be profitably employed are (a) in the separation of branched and straight chain olefins or xylene isomers for use as pure chemical intermediates in the preparation of detergents and plastics, (b) in the isolation of antibiotics such as tetracyclines from dilute aqueous solutions of the type employed in their preparation, and (c) in the manufacture of improved jet fuels and lubricating oils by selective removal of straight chain hydrocarbons.

It will be understood from the foregoing that depending on the material treated and function sought, compositions are selected containing types and ratios of the cyclic dextrins appropriate to the particular application.

In addition to the insoluble cyclic dextrin derivatives of the invention in the foregoing various applications, use may also be made of the water insoluble cyclic dextrins known in the prior art particularly in those applications where aqueous solutions are employed. Illustrative of compounds known in the prior art which are water insoluble but are soluble in many organic solvents are the acetate ester and methyl ether derivatives of the cyclic dextrin.

It will be noted that the latter are derived from the reaction of cyclic dextrin with a chemical compound capable of reacting with only one hydroxyl group. The latter are thus non-polymeric, non-crosslinked cyclic dextrin derivatives as contrasted to the novel compounds of the invention which result from joining together a plurality of different cyclic dextrin residues.

In order that the invention may be more fully understood, the following examples are presented by way of illustration. Parts stated are parts by weight except where particularly stated otherwise.

EXAMPLE 1

To a solution of 1.0 part of sodium in 1000 parts of liquid ammonia is added, in 8 portions, 16 parts of dry alpha cyclodextrin. After stirring for one hour, the ammonia is evaporated, and to the residue is added 50 parts of 1,4-dichlorobutene-2. The mixture is heated with stirring at 60° C. for 6 hours, cooled, and filtered to furnish 17 parts of cyclodextrin derivatives as tan granules. Small quantities of impurities which may be present can be removed by washing first with acetone and then with water. The cyclic dextrin derivative is substantially water insoluble.

EXAMPLE 2

To a dry solution of 10 parts of alpha cyclodextrin in 400 parts of dimethyl sulfoxide is added 9 parts of tolylene-2,4-diisocyanate and 0.2 part of triethylenediamine. The resulting mixture is heated at 110° C. for six hours with stirring. After cooling and dilution with an equal volume of acetone, the product is collected by filtration and purified by washing with acetone and water. The derivatized product is water insoluble.

EXAMPLE 3

The procedure of Example 2 is essentially repeated except that 10 parts of a crude, dry cyclodextrin preparation is used in place of alpha cyclodextrin. The crude cyclodextrin preparation used in this example is obtained by the procedure described by D. French, A. O. Pulley and W. J. Whelan, in Die Starke, 280 (1963). This published procedure is followed to the point of 16 hours of treatment with *B. macerans,* at the end of which time the entire mixture is taken to dryness. The residue is employed in the reaction with tolylene-2,4-diisocyanate. The cyclodextrin derivative is water insoluble and may be employed as a flavor entrapping agent.

EXAMPLE 4

To a dry solution of 9 parts of cyclodextrin mixture, composed of 3 parts each of alpha, beta and gamma cyclodextrin, in 500 parts of dimethyl sulfoxide is added 4 parts of dry glutaraldehyde and 2 parts of concentrated sulfuric acid. The resulting solution is heated at 100° C. for 12 hours, cooled, diluted with acetone and filtered giving the solid cyclodextrin derivative. Purification is accomplished by washing with ethanol and water.

EXAMPLE 5

To a dry solution of 10 parts of crude cyclodextrins, obtained as described in Example 3, in 500 parts of dimethyl sulfoxide is added 3 parts of potassium tertiary butoxide and 4 parts of sebacyl chloride. The mixture is heated at 100° C. for 6 hours, cooled, diluted with ethanol and filtered. The solid cyclodextrin derivative is purified by washing with alcohol and water.

EXAMPLE 6

The procedure of Example 5 is substantially repeated except that 4 parts of dimethyl terephthalate is used in place of sebacyl chloride. The product is a solid cyclodextrin derivative which is essentially insoluble in water.

EXAMPLE 7

The procedure of Example 5 is again substantially repeated except that 3 parts of dichlorodimethylsilane is used in place of sebacyl chloride.

EXAMPLE 8

To one liter of a hot aqueous solution of 10 parts of beta cyclodextrin is added 3 parts of trimetyhlol melamine. The pH is adjusted to 3.5 with phosphoric acid and the solution is evaporated to dryness. The solid residue is a cyclic dextrin derivative.

EXAMPLE 9

To a mixture containing cyclodextrins obtained by treating 10.2 parts of potato starch in 195 parts of water with *B. macerans* as described by D. French et al in Die Starke, 280 (1963), is added 3 parts of 30% formaldehyde solution and the pH is adjusted to 2.5. The mixture is heated and then taken to dryness to furnish a cyclodextrin derivative.

EXAMPLE 10

To 50 parts of dimethyl sulfoxide containing one part each of alpha and beta cyclodextrins is added 2 parts of the diglycidyl ether of 1,4-butanediol. The mixture is heated at 80° C. for 5 hours, cooled, diluted with acetone and filtered to give the cyclodextrin derivative.

EXAMPLE 11

A cigarette filter is prepared consisting of three sections. The first and third sections are composed of ¼ inch plugs of cellulose acetate. The second section between the cellulose acetate plugs is a compartment of approximately equal volume, i.e., approximately ¼ inch in length, packed with the cyclodextrin derivative of Example 3. The entire filter is surrounded with paper and joined to a cigarette. The cigarette is smoked in a fashion simulating that practiced in normal usage and the smoke stream is analyzed by means of vapor phase chromatography. It is found that significant reduction in certain smoke components occurs compared to control cigarettes which do not contain the cyclodextrin derivative.

EXAMPLE 12

Example 11 was essentially repeated using instead of the insolubilized cyclic derivative of Example 3, the cyclic dextrin derivative of Example 5. Comparable results are obtained.

While in cigarette filters it is generally desirable to employ a material which is generally insensitive to water and consequently the water insoluble cyclic dextrin derivatives are preferred, it may nevertheless be suitable to employ cyclic dextrins which are in fact water soluble on a support which is water resistant. In this instance the support functions to make the combination effective as for example, preventing blockage of the porous filter media.

EXAMPLE 13

A sample of orange water aroma is obtained by evaporation of fresh orange juice followed by condensation of the vapors, the condensate being employed as the orange water aroma. This is allowed to trickle slowly through a fixed bed of cyclic dextrin derivatives obtained by the procedure of Example 3. Much of the delicate flavor and aroma constituents is thereby anchored in the cyclic dextrin derivative. The flavor retained by this derivative is recovered by heating the derivative with a small volume of water in a closed system, cooled and incororated in a frozen orange juice concentrate to impart improved flavor and aroma thereto.

EXAMPLE 14

A dilute aqueous solution containing cinnamic alcohol and eugenol is allowed to trickle slowly through a fixed bed of cyclic dextrin derivative prepared as in Example 2. The aqueous solution after passing through the bed contains only the eugenol. The bed is washed with alcohol to give a solution containing the cinnamic alcohol. A separation of these two chemical components is thereby achieved.

It will be understood that various modifications apparent to one skilled in the art can be made based on the teaching of the invention without departing from the scope of the invention.

We claim:

1. A composition of matter consisting essentially of an insolubilized cyclic dextrin derivative formed by the reaction of a non-fermentable cyclic dextrin and an organic compound containing at least two functional units and wherein said units are selected from the group consisting of lower aldehydes, lower ketones, lower alkyl halides, isocyanate, lower acyl halides, lower carboxyl esters, lower epoxides, hydroxymethyl amine and silicon halides.

2. A composition of matter consisting essentially of an insolubilized cyclic dextrin derivative formed by the reaction of a non-fermentable cyclic dextrin and a lower aldehyde.

3. A composition of matter consisting essentially of an insolubilized cyclic dextrin derivative formed by the reaction of a non-fermentable cyclic dextrin and a lower polyhalo hydrocarbon.

4. A composition of matter consisting essentially of an insolubilized cyclic dextrin derivative formed by the reaction of a non-fermentable cyclic dextrin and a di- or polyisocyanate.

5. A composition of matter consisting essentially of an insolubilized cyclic dextrin derivative formed by the reaction of a non-fermentable cyclic dextrin and a lower di- or polyepoxide.

6. A composition of matter consisting essentially of an insolubilized cyclic dextrin derivative formed by the reaction of a non-fermentable cyclic dextrin and a di- or polyhydroxymethyl amine.

References Cited

UNITED STATES PATENTS

| | | |
|---|---|---|
| 2,671,779 | 3/1954 | Gaver et al. |
| 2,761,247 | 9/1956 | Meadows. |
| 2,827,452 | 3/1958 | Schlenk et al. |
| 2,813,797 | 11/1957 | Toulmin. |
| 3,140,184 | 7/1964 | Robbins. |
| 2,811,516 | 10/1957 | Novak. |
| 2,954,372 | 9/1960 | Novak. |
| 2,961,439 | 11/1960 | Novak. |

LEWIS GOTTS, Primary Examiner

J. R. BROWN, Assistant Examiner

U.S. Cl. X.R.

44—63; 99—28, 135, 140; 131—17, 269; 208—310; 252—52, 89, 352; 260—559, 999